United States Patent
Okumura et al.

(10) Patent No.: US 10,075,652 B2
(45) Date of Patent: Sep. 11, 2018

(54) IMAGE PROCESSING DEVICE FOR TRACKING A TARGET OBJECT AND IMAGE PROCESSING METHOD, COMPUTER PROGRAM PRODUCT, AND IMAGE PROCESSING SYSTEM FOR SAME

(71) Applicant: KABUSHIKI KAISHA TOSHIBA, Tokyo (JP)

(72) Inventors: Mayu Okumura, Kanagawa (JP); Tomoki Watanabe, Tokyo (JP); Tsuyoshi Tasaki, Kanagawa (JP); Tsuyoshi Takatani, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 162 days.

(21) Appl. No.: 15/075,309

(22) Filed: Mar. 21, 2016

(65) Prior Publication Data
US 2016/0284098 A1 Sep. 29, 2016

(30) Foreign Application Priority Data
Mar. 23, 2015 (JP) ................................ 2015-059573

(51) Int. Cl.
*G06K 9/00* (2006.01)
*H04N 5/247* (2006.01)
(Continued)

(52) U.S. Cl.
CPC ............. *H04N 5/247* (2013.01); *G06T 7/292* (2017.01); *G06T 7/41* (2017.01)

(58) Field of Classification Search
CPC .................................................... G06T 7/292
(Continued)

(56) References Cited

U.S. PATENT DOCUMENTS 9,659,231 B2 * 5/2017 Sakai .................... G06K 9/6202
2003/0107649 A1 * 6/2003 Flickner ............. G06K 9/00362
348/150

(Continued)

FOREIGN PATENT DOCUMENTS

GB   201516981   * 11/2015   ............. H04N 7/181
JP   2005-092262   4/2005
(Continued)

OTHER PUBLICATIONS

Makihara, Y. et al., "Gait Identification Using a View Transformation Model in the Frequency Domain." The Institute of Scientific and Industrial Research, Osaka University and Department of Engineering Informatics, Osaka Electro-Communication University, vol. 48, No. SIG 1 (CVIM 17), Feb. 2007, pp. 78-87 (English-language abstract).

(Continued)

*Primary Examiner* — Gandhi Thirugnanam
(74) *Attorney, Agent, or Firm* — Nixon & Vanderhye, P.C.

(57) ABSTRACT

According to an embodiment, an image processing device includes an image acquirer, a tracker, an extractor, a feature amount acquirer, and an association controller. The image acquirer is configured to acquire a time series of images from each imaging device. The tracker is configured to track a position of an object in the time series of images. The extractor is configured to extract, from the time series of images, an observed value corresponding to a feature value in each of regions into which the time series of images is divided depending on a distance from the imaging device. The feature amount acquirer is configured to acquire a feature amount based on a deviation value of the observed value in a feature value distribution for the region. The association controller is configured to associate the tracked (Continued)

objects among multiple time series of images acquired from the imaging devices by using the feature amount.

10 Claims, 14 Drawing Sheets

(51) Int. Cl.
    *G06T 7/292* (2017.01)
    *G06T 7/41* (2017.01)

(58) Field of Classification Search
    USPC .......................................................... 382/103
    See application file for complete search history.

(56) References Cited

U.S. PATENT DOCUMENTS

| | | | | |
|---|---|---|---|---|
| 2004/0130620 | A1* | 7/2004 | Buehler | G06K 9/00335 348/143 |
| 2006/0187305 | A1* | 8/2006 | Trivedi | G06K 9/00234 348/169 |
| 2008/0101652 | A1* | 5/2008 | Zhao | G06K 9/00369 382/103 |
| 2008/0123900 | A1* | 5/2008 | Ma | G06K 9/32 382/103 |
| 2011/0135154 | A1* | 6/2011 | Wedge | G06K 9/6202 382/103 |
| 2012/0045096 | A1* | 2/2012 | Naito | G06K 9/00771 382/103 |
| 2012/0069192 | A1* | 3/2012 | Li | G06T 7/292 348/159 |
| 2012/0243730 | A1* | 9/2012 | Outtagarts | G06K 9/00771 382/103 |
| 2013/0034266 | A1* | 2/2013 | Shamir | G06K 9/6293 382/103 |
| 2013/0128050 | A1* | 5/2013 | Aghdasi | H04N 7/181 348/158 |
| 2014/0294231 | A1* | 10/2014 | Datta | G06T 7/251 382/103 |
| 2015/0161794 | A1* | 6/2015 | Saito | H04N 7/188 382/103 |
| 2016/0284098 | A1* | 9/2016 | Okumura | H04N 5/247 |

FOREIGN PATENT DOCUMENTS

| | | |
|---|---|---|
| JP | 2008-236437 | 10/2008 |
| JP | 2010-068466 | 3/2010 |
| JP | 2013-222447 | 10/2013 |

OTHER PUBLICATIONS

Okumura, M., et al., "The Online Measurement of the Gait Feature for an Audience-Participation Digital Entertainment." The Institute of Scientific and Industrial Research, Osaka University, (MIRU2009), 2009, pp. 1336-1343 (English-language abstract).

Kalal, Z., et al., "Tracking-Learning-Detection." IEEE Transactions on Pattern Analysis and Machine Intelligence, vol. 6, No. 1, Jan. 2010, pp. 1-14.

Watanabe, T., et al., "Co-occurrence Histograms of Oriented Gradients for Human Detection." IPSJ Transmations on Computer Vison and Applications., vol. 2, 2010, pp. 659-667.

* cited by examiner

FIG.6
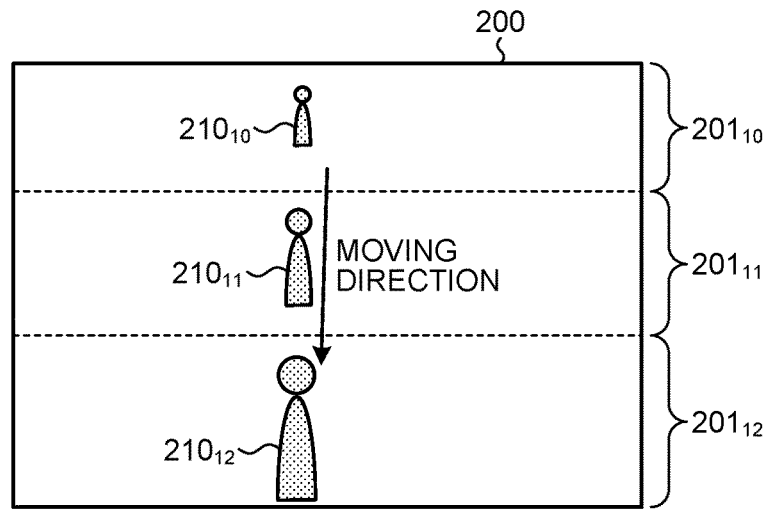
FIG.7
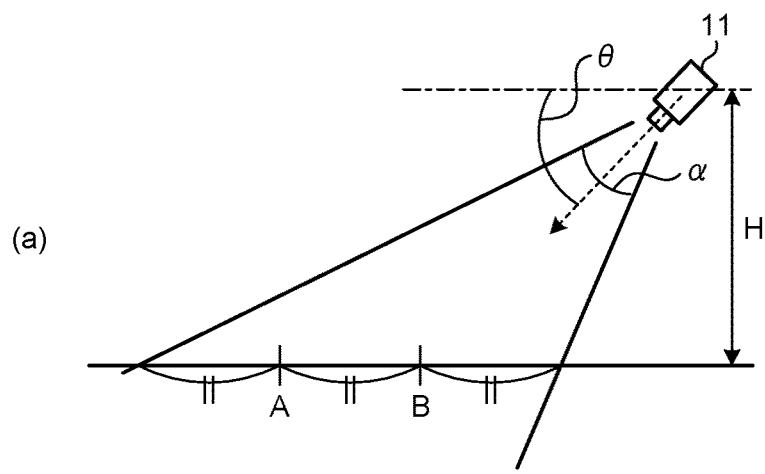
(a)
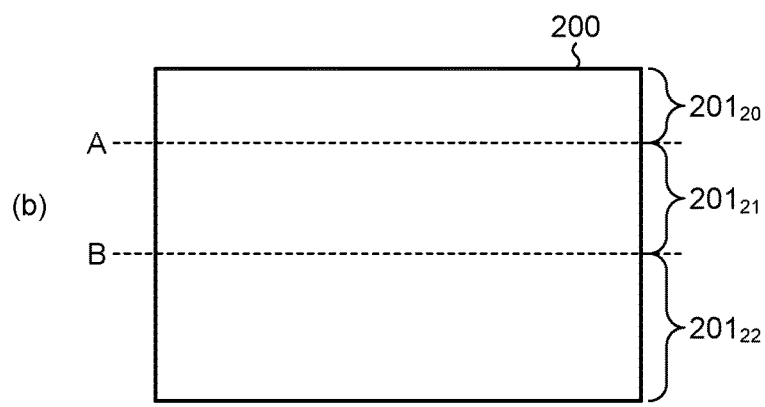
(b)

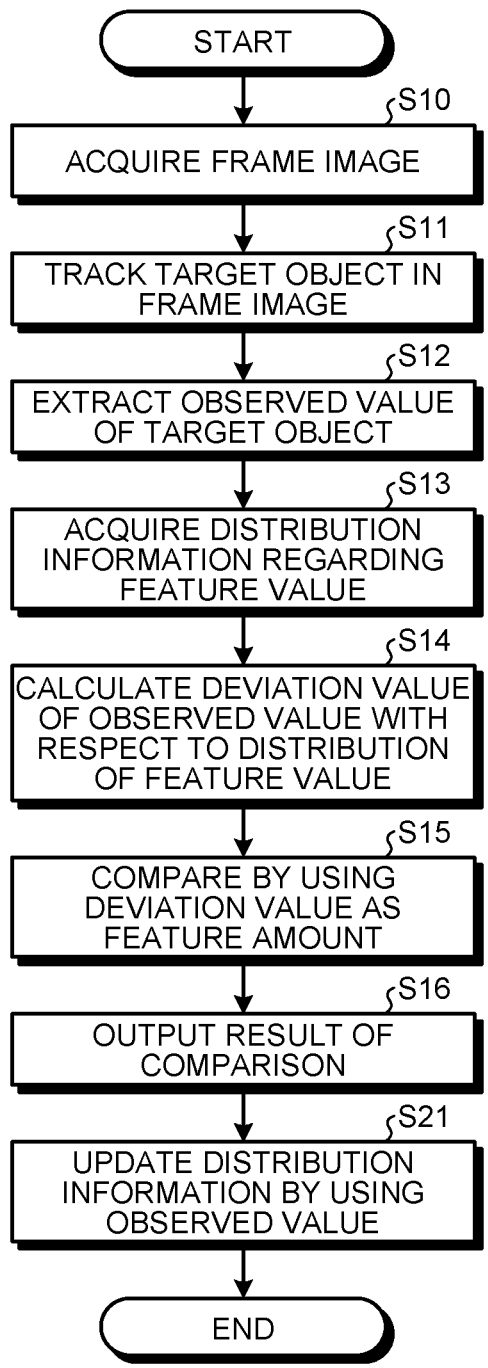

IMAGE PROCESSING DEVICE FOR TRACKING A TARGET OBJECT AND IMAGE PROCESSING METHOD, COMPUTER PROGRAM PRODUCT, AND IMAGE PROCESSING SYSTEM FOR SAME

CROSS-REFERENCE TO RELATED APPLICATION

This application is based upon and claims the benefit of priority from Japanese Patent Application No. 2015-059573, filed on Mar. 23, 2015; the entire contents of which are incorporated herein by reference.

FIELD

Embodiments described herein relate generally to an image processing device, an image processing method, a computer program product, and an image processing system.

BACKGROUND

Technology of tracking a target by associating the targets with one another among a plurality of cameras without a common viewing field is conventionally known. For example, spectral distribution information is acquired from image information acquired by imaging a subject with known color or spectral reflectivity placed in an imaging region for each camera. It is possible to associate the targets with one another among the cameras without depending on a light source environment by using the spectral distribution information acquired in this manner.

According to the conventional technology, it is required to prepare a subject with known color or spectral reflectivity, and it is further required that the subject is imaged by each camera and spectral distribution information is collected for each camera. Therefore, there is a problem that collecting the information is not easy when the number of cameras is large and tracking a target with high accuracy might be difficult.

BRIEF DESCRIPTION OF THE DRAWINGS

FIG. 6 is a view illustrating an example of a frame image;

FIG. 7 illustrates an example of a method of determining a divided region according to each embodiment;

FIG. 17 is a flowchart of an example illustrating the image processing according to the second embodiment.

DETAILED DESCRIPTION

According to an embodiment, an image processing device includes an image acquirer, a tracker, a storage, an extractor, a feature amount acquirer, and an association controller. The image acquirer is configured to acquire a time series of images from each of a plurality of imaging devices. The tracker is configured to track a position of a target object in the time series of images. The storage is configured to store distributions of feature values for respective regions into which the time series of images is divided depending on a distance from a corresponding imaging device. The extractor is configured to extract an observed value corresponding to a feature value in each of the regions from the time series of images. The feature amount acquirer is configured to acquire a feature amount based on a deviation value of the observed value in the distribution for the corresponding region. The association controller is configured to associate target objects tracked by the tracker with one another among multiple time series of images acquired from the plurality of imaging devices by using the feature amount.

An image processing device, an image processing method, an image processing program, and an image processing system according to embodiments are hereinafter described.

Configuration Common to Embodiments

Figure 1:
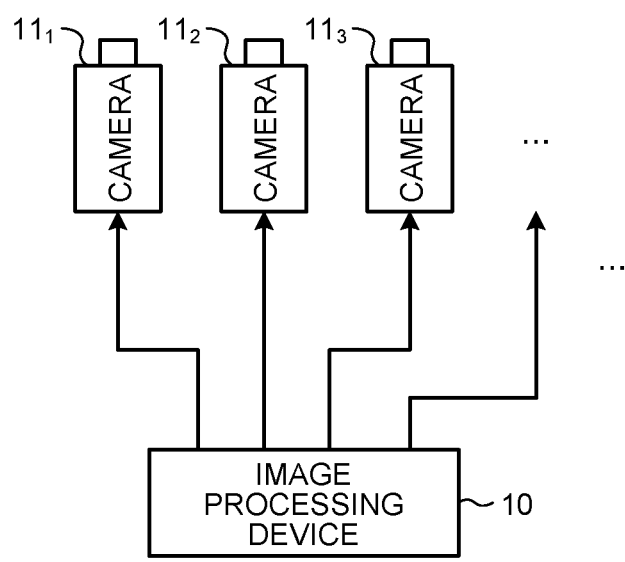
FIG. 1 is a block diagram illustrating a configuration of an example of an image processing system commonly applicable to embodiments.

FIG. 1 illustrates a configuration of an example of the image processing system commonly applicable to the embodiments. In FIG. 1, the image processing system is provided with an image processing device 10 and a plurality of cameras $11_1$, $11_2$, $11_3$ and the like commonly applicable to the embodiments.

Each of the cameras $11_1$, $11_2$, $11_3$ and the like outputs a time-series image acquired by imaging at a plurality of timings in chronological order with an imaging direction and an imaging range fixed. The time-series image is a moving image including frame images imaged at a predetermined time interval, for example. Each of the cameras $11_1$, $11_2$, $11_3$ and the like is installed indoors or outside at an angle to look down at an observed target, for example. The imaging ranges of the cameras $11_1$, $11_2$, $11_3$ and the like are not required to be overlapped.

Figure 2:
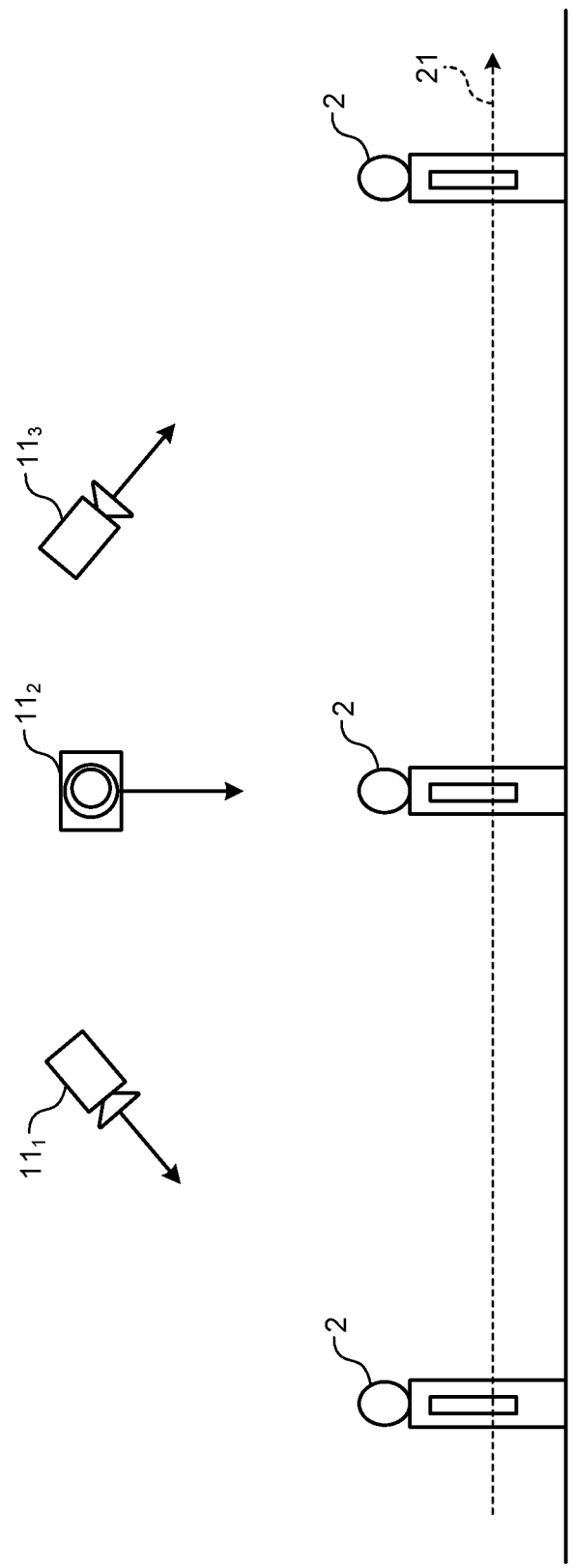
FIG. 2 is a view for illustrating an installing place of a camera according to a first embodiment.

A camera which images visible light is used, for example, as each of the cameras $11_1$, $11_2$, $11_3$ and the like. The camera is not limited to this, and an infrared camera which images infrared light may also be used as each of the cameras $11_1$, $11_2$, $11_3$ and the like. The imaging direction on a horizontal plane of each of the cameras $11_1$, $11_2$, $11_3$ and the like is not especially limited. For example, it is possible to arrange the cameras $11_1$, $11_2$, $11_3$ and the like such that they image in different directions as illustrated in FIG. 2. In a case of the example in FIG. 2, an observed target 2 which moves in a direction indicated by arrow 21 is imaged from the front, from a side, and from behind by the cameras $11_1$, $11_2$, $11_3$ and the like.

The observed target 2 being a moving object a position of which moves in chronological order is, for example, a human. Hereinafter, the moving object being the observed target 2 is referred to as a target object.

The time-series images output from the cameras $11_1$, $11_2$, $11_3$ and the like are supplied to the image processing device 10. The image processing device 10 performs image processing on each of the time-series images supplied from the cameras $11_1$, $11_2$, $11_3$ and the like and associates the images of the same target object with one another among the time-series images to track the same target object in chronological order.

Herein, the image processing device 10 according to the first embodiment stores information indicating feature value distribution for each of the cameras $11_1$, $11_2$, $11_3$ and the like. The image processing device 10 extracts each observed value corresponding to a feature value from the target object included in each of the time-series images supplied from the cameras $11_1$, $11_2$, $11_3$ and the like and calculates a deviation value in the stored feature value distribution of each extracted observed value to acquire a feature amount based on the acquired deviation value. The image processing device 10 associates the target objects with one another among the time-series images by using the feature amount acquired for the target object extracted from each time-series image to track.

The image processing device 10 stores the information indicating the feature value distribution for each divided region acquired by dividing the frame image according to an imaging distance, for example, for each of the cameras $11_1$, $11_2$, $11_3$ and the like. The image processing device 10 extracts the observed value in units of divided region from the frame image of each of the time-series images supplied from the cameras $11_1$, $11_2$, $11_3$ and the like and calculates the deviation value in the distribution to which the divided region corresponds out of the stored distribution.

According to this, it becomes possible to track the target object with high accuracy among the time-series images imaged by the cameras $11_1$, $11_2$, $11_3$ and the like. At that time, the target objects are associated with one another in units of divided region acquired by dividing each frame image of each time-series image according to the imaging distance, so that calibration among the cameras $11_1$, $11_2$, $11_3$ and the like is not required.

Figure 3:
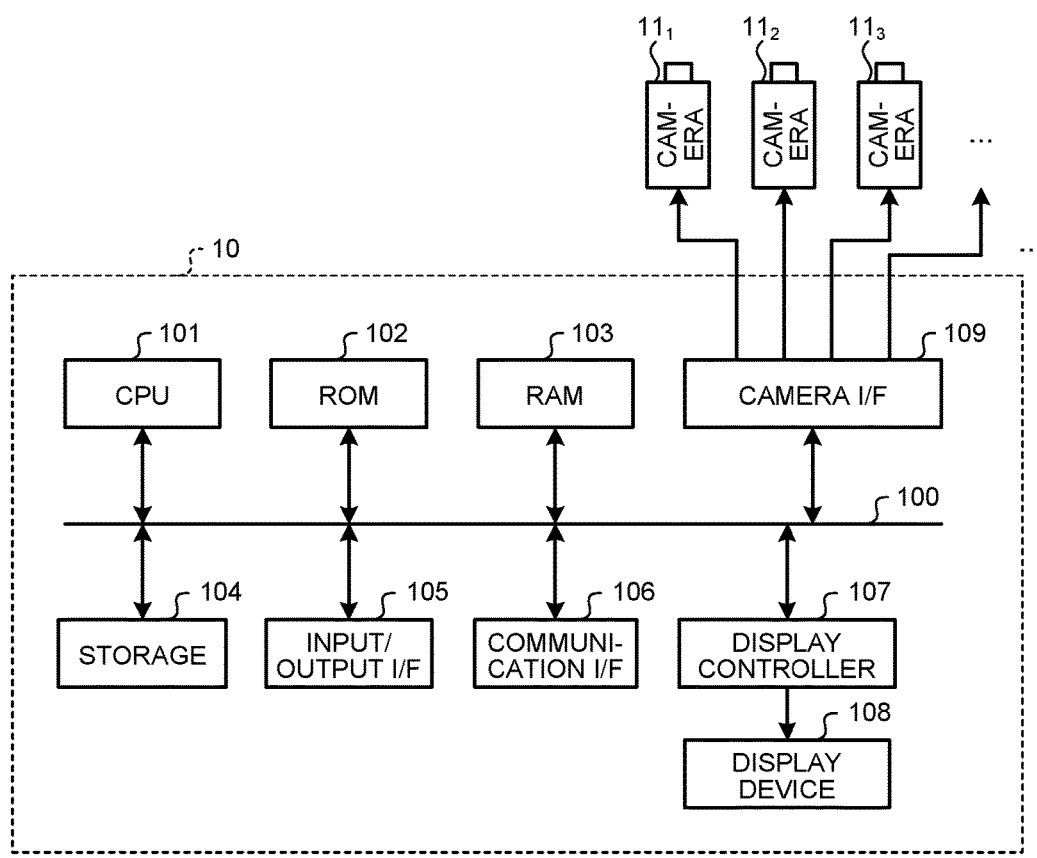
FIG. 3 is a block diagram illustrating a configuration of an example of an image processing device according to the first embodiment.

FIG. 3 illustrates a configuration of an example of the image processing device 10 commonly applicable to the embodiments. The image processing device 10 is provided with a CPU (central processing unit) 101, a ROM (read only memory) 102, a RAM (random access memory) 103, a storage 104, an input/output I/F 105, a communication I/F 106, a display controller 107, and a camera I/F 109, the units connected by a bus 100 such that they may communicate to one another. The image processing device 10 may be realized with a configuration similar to that of a general computer in this manner.

The CPU 101 allows the RAM 103 to operate as a work memory according to a program stored in advance in the ROM 102 and the storage 104 to control entire operation of the image processing device 10. The storage 104 being a hard disk drive and a non-volatile semiconductor memory (flash memory) stores the program by which the CPU 101 operates and various data.

The input/output I/F 105 being a USB (universal serial bus), for example, is an interface for transmitting/receiving the data to/from an external device. It is possible to connect an input device such as a keyboard and a pointing device (such as mouse) to the input/output I/F 105. It is also possible to connect a drive device which reads a disk storage medium such as a CD (compact disk) and a DVD (digital versatile disk) to the input/output I/F 105. The communication I/F 106 controls communication with a network such as a LAN (local area network) and the Internet. The display controller 107 converts a display control signal generated according to the program by the CPU 101 to a display signal which a display device 108 in which an LCD (liquid crystal display) and the like is used as a display device may display to output.

The camera I/F 109 captures image signals output from the cameras $11_1$, $11_2$, $11_3$ and the like and outputs the same to the bus 100 as each of the time-series images by the cameras $11_1$, $11_2$, $11_3$ and the like including a plurality of frame images in chronological order described above.

First Embodiment

Figure 4:
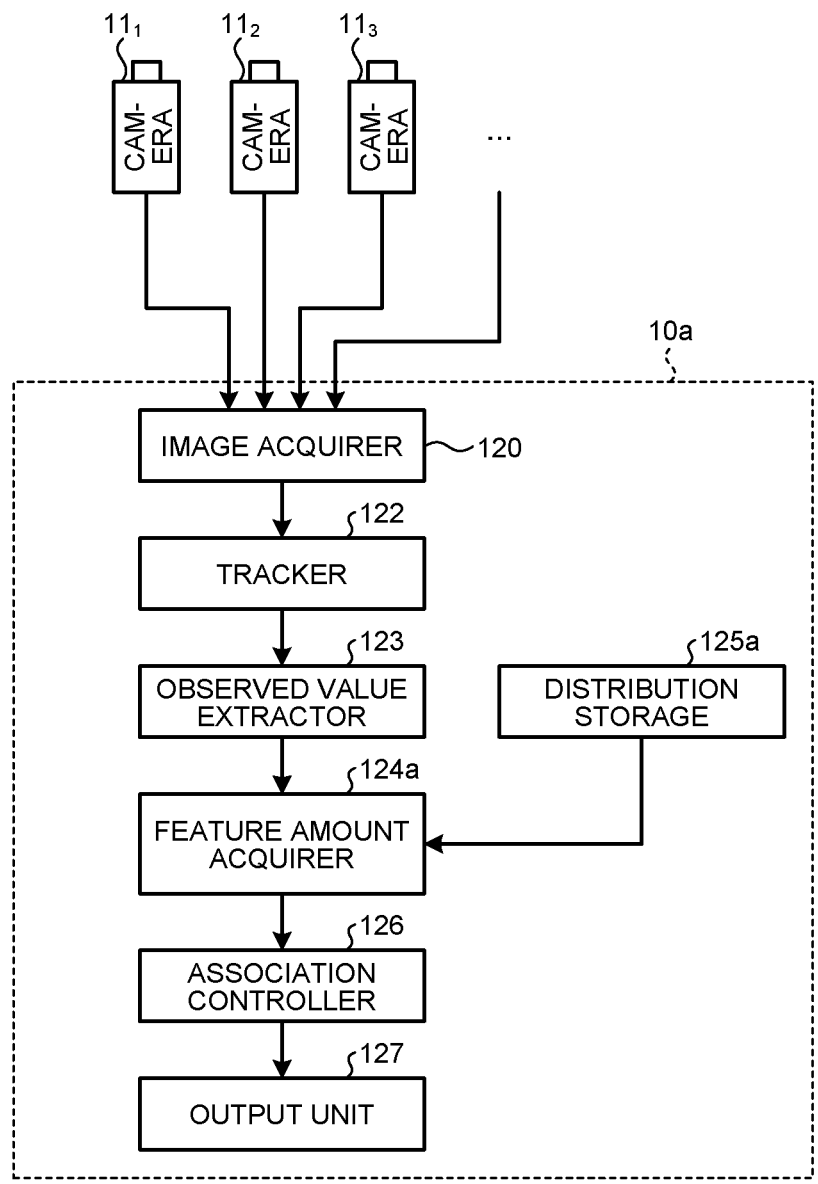
FIG. 4 is a functional block diagram of an example for illustrating a function of the image processing device according to the first embodiment.

FIG. 4 is a functional block diagram of an example for illustrating a function of an image processing device 10a according to a first embodiment. In FIG. 4, the image processing device 10a is provided with an image acquirer 120, a tracker 122, an observed value extractor 123, a feature amount acquirer 124a, a distribution storage 125a, an association controller 126, and an output unit 127.

The image acquirer 120 acquires a frame image from a time-series image supplied from each of cameras $11_1$, $11_2$, $11_3$ and the like. The image acquirer 120 also acquires identification information (referred to as image identification information) to specify the camera which acquires the frame image. The image acquirer 120 adds the image identification information to the frame image to supply to the tracker 122.

The tracker 122 detects a target object imaged in the frame image supplied from the image acquirer 120 and tracks a position of the image of the target object in the frame image among the frames. Meanwhile, the "image of the target object" is hereinafter simply referred to as a "target object" unless otherwise noted. The tracker 122 supplies information indicating the position of the target object in each frame image being a tracked result to the observed value extractor 123 after adding moving object identification information to identify the target object to the same.

The distribution storage 125a corresponding to a storage 104 or a RAM 103, for example, stores information indicating feature value distribution to evaluate the target object in the frame image for each of the cameras $11_1$, $11_2$, $11_3$ and the like. At that time, the distribution storage 125a stores the information indicating the feature value distribution for each region acquired by dividing the frame image.

The observed value extractor 123 extracts an observed value corresponding to the feature value from the target object in a target frame image. Herein, the observed value extractor 123 extracts the observed value from the target object included in the region in units of the above-described region. The observed value extractor 123 supplies the observed value to the feature amount acquirer 124a after adding the moving object identification information to the same.

The feature amount acquirer 124a calculates a deviation value of the observed value in the distribution by using the information indicating the feature value distribution for each region stored in the distribution storage 125a and the observed value corresponding to the feature value supplied from the observed value extractor 123 and acquires a feature amount having the calculated deviation value as a feature vector. The feature amount acquirer 124a supplies the acquired feature amount to the association controller 126 after adding the moving object identification information to the same.

The association controller 126 associates the tracked results of the target objects with one another among the time-series images acquired from the cameras $11_1$, $11_2$, $11_3$ and the like based on the feature amount acquired by the feature amount acquirer 124a. Information indicating a result of association is supplied to the output unit 127.

The output unit 127 outputs the information indicating the result of association and presents the same to a user, for example. As an example, the output unit 127 may generate an image to be displayed by adding the moving object identification information associated by the association controller 126 to the target object included in each of the time-series images. The image is displayed on a display device 108, for example, to be presented to the user.

The image acquirer 120, the tracker 122, the observed value extractor 123, the feature amount acquirer 124a, the distribution storage 125a, the association controller 126, and the output unit 127 are realized by an image processing program operating on a CPU 101 described above. There is no limitation and it is also possible to configure a part or all of the image acquirer 120, the tracker 122, the observed value extractor 123, the feature amount acquirer 124a, the distribution storage 125a, the association controller 126, and the output unit 127 by pieces of cooperatively operating hardware.

Meanwhile, one image acquirer 120 may be provided on the image processing device 10 as illustrated in FIG. 4 or this may be provided on each of the cameras $11_1$, $11_2$, $11_3$ and the like. There is no limitation and it is also possible to provide the image acquirer 120, the tracker 122, the observed value extractor 123, the feature amount acquirer 124a, and the distribution storage 125a on each of the cameras $11_1$, $11_2$, $11_3$ and the like. Furthermore, a configuration to incorporate the image acquirer 120, the tracker 122, the observed value extractor 123, the feature amount acquirer 124a, and the distribution storage 125a in each of the cameras $11_1$, $11_2$, $11_3$ and the like is also possible.

Figure 5:
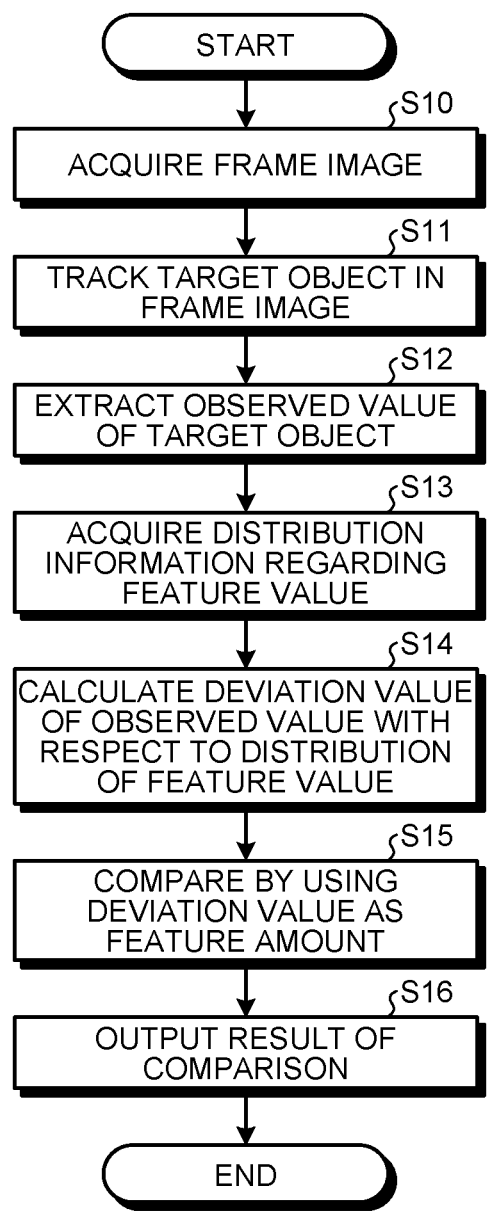
FIG. 5 is a flowchart of an example illustrating image processing according to the first embodiment.

FIG. 5 is a flowchart of an example illustrating image processing by the image processing device 10a according to the first embodiment. The image processing according to the first embodiment is schematically described with reference to the flowchart in FIG. 5. Meanwhile, it is hereinafter described supposing that the target object is a human. It goes without saying that the target object is not limited to the human; this may also be a part of the human such as a face and arms and legs or this may also be an animal other than the human. Furthermore, the target object may also be a machine such as a vehicle and a bicycle.

Before executing the processing in the flowchart in FIG. 5, the frame image of the time-series image acquired by each of the cameras $11_1$, $11_2$, $11_3$ and the like is divided in a predetermined manner.

A method of dividing the frame image commonly applied to the embodiments is described. FIG. 6 illustrates an example of a frame image 200 of the time-series image imaged by the camera $11_1$, for example. Herein, when the camera $11_1$ is installed to look down at an observed target (target object), a place with a longer distance is imaged on an upper end side of the frame image 200 and a place with a shorter distance is imaged on a lower end side of the same. Therefore, a size of the target object changes in the frame image 200 according to the distance of the target object from the camera $11_1$ even when the same target object is a subject.

More specifically, as illustrated in FIG. 6, when the same target object moves to get closer to the camera $11_1$, the image of the target object moves from the upper end side to the lower end side in the frame image 200 and the size of the image gradually increases along with the movement. This state is illustrated in images $210_{10}$, $210_{11}$, and $210_{12}$ in FIG. 6. In this case, the observed value acquired from the same target object may vary according to the size of the target object in the frame image 200.

Therefore, in each embodiment, the frame image 200 is divided according to an imaging distance and the observed value of the target object is acquired in units of divided region. At that time, the frame image 200 is divided such that relative height of each target object relative to each region becomes substantially the same supposing that the same target object is included in each region.

In the example in FIG. 6, the frame image 200 is divided into three parts in a horizontal direction and regions $201_{10}$, $201_{11}$, and $201_{12}$ are formed. The regions $201_{10}$, $201_{11}$, and $201_{12}$ are formed with the height sequentially increasing from the upper end on which the camera $11_1$ images the place with the longest distance to the lower end on which this images the place with the shortest distance in the frame image 200.

An example of a method of determining the divided region according to each embodiment is schematically described with reference to FIG. 7. For example, an imaging range on a floor surface by the camera 11 when the camera 11 having an image angle α is installed at installation height H (height from the floor surface) and with an imaging direction at an imaging angle θ with respect to the floor surface is equally divided into the desired number of regions as illustrated in (a) in FIG. 7. In the example in (a) in FIG. 7, the imaging range is equally divided into three regions in positions A and B. In this case, the frame image 200 is divided in the horizontal direction in positions corresponding to the positions A and B in the frame image 200 to form regions $201_{20}$, $201_{21}$ and $201_{22}$ as illustrated in (b) in FIG. 7.

The frame image 200 is divided in this manner for each frame image of the time-series image by each of the cameras $11_1$, $11_2$, $11_3$ and the like. The information indicating the dividing position of the frame image 200 of each of the cameras $11_1$, $11_2$, $11_3$ and the like is set in advance in the observed value extractor 123 and the distribution storage 125a.

Figure 8:
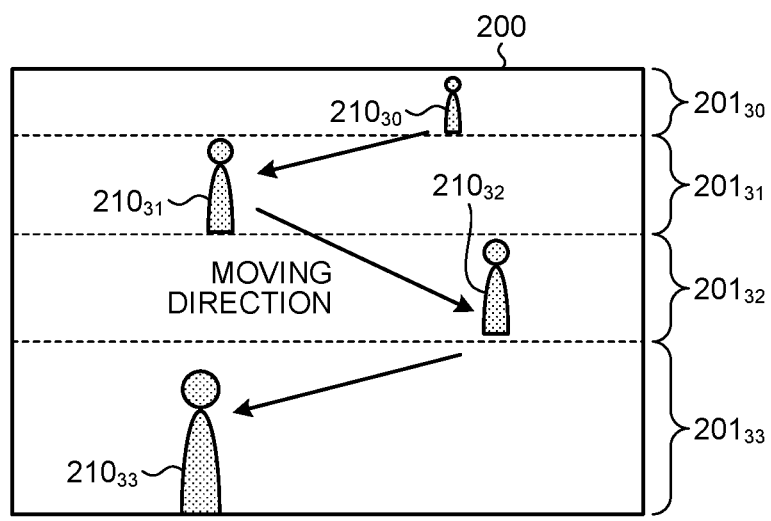
FIG. 8 is a view for schematically illustrating another example of the method of determining the divided region according to each embodiment.

Although the frame image 200 is simply divided according to the imaging distance from the camera $11_1$ in the description above, this is not limited to this example. For example, it is also possible to divide the frame image 200 according to change in a moving direction of the target object in the frame image 200 as illustrated in FIG. 8 as another example. That is to say, the frame image 200 is divided in a position in which the moving direction of the target object changes by a predetermined degree or larger.

When the same target object moves to get closer to the camera $11_1$ while changing the moving direction to right and left with respect to the imaging direction of the camera $11_1$, the image of the target object moves to right and left as this moves from the upper end side to the lower end side in the frame image 200 and the size of the image gradually increases along with the movement from the upper end to the lower end. This state is illustrated in FIG. 8 in images $210_{30}$, $210_{31}$, $210_{32}$, and $210_{33}$.

In the example in FIG. 8, the target object starts moving leftward from a position of the image $210_{30}$ while moving in a direction to get closer to the camera $11_1$, this changes the moving direction to right in a position of the image $210_{31}$, and further, this changes the moving direction to left in a position of the image $210_{32}$. Therefore, in the example in FIG. 8, the frame image 200 is divided in the horizontal direction at a changing point of the moving direction in addition to the distance in the imaging direction of the camera $11_1$ to form regions $201_{30}$, $201_{31}$, $201_{32}$, and $201_{33}$.

As an example, in a case in which it may be predicted in advance that the moving direction of the target object changes such as at a shop, the changing point of the moving direction may be further applied as the dividing position of the frame image 200.

Returning to the description of the flowchart in FIG. 5, at step S10, in the image processing device 10a, the image acquirer 120 acquires the frame image from the time-series image supplied from each of the cameras $11_1$, $11_2$, $11_3$ and the like and adds the image identification information for identifying the cameras $11_1$, $11_2$, $11_3$ and the like to each acquired frame image. The frame image acquired by the image acquirer 120 is supplied to the tracker 122.

Meanwhile, in the flowchart in FIG. 5, processes at steps S11 to S14 are executed for each frame image acquired from the time-series image supplied from each of the cameras $11_1$, $11_2$, $11_3$ and the like. Hereinafter, for the purpose of description, the time-series image and the frame image acquired from the camera $11_1$ are described as an example.

At next step S11, the tracker 122 detects the target object from the frame image acquired by the image acquirer 120 and tracks the position of the detected target object in the frame image among the frame images of the same time-series image. At next step S12, the observed value extractor 123 extracts the observed value of the target object from the frame image acquired by the image acquirer 120 at step S10. At that time, the observed value extractor 123 extracts the observed value for each region acquired by dividing the frame image.

At next step S13, the feature amount acquirer 124a acquires the information indicating the feature value distribution calculated for each region acquired by dividing the frame image corresponding to the camera $11_1$ from the distribution storage 125a.

Meanwhile, although the flowchart in FIG. 5 illustrates that the processes at steps S12 and S13 are sequentially executed, this is not limited to this example. For example, steps S12 and S13 may be executed in parallel or the order of the processes at steps S12 and S13 may be changed.

At next step S14, the feature amount acquirer 124a acquires the deviation value of each observed value extracted by the observed value extractor 123 at step S12 by using the information indicating the feature value distribution acquired from the distribution storage 125a at step S13. Then, the feature amount acquirer 124a acquires the feature amount having the acquired deviation value as the feature vector.

At next step S15, the image processing device 10a compares the feature amounts corresponding to the cameras $11_1$, $11_2$, $11_3$ and the like acquired by the feature amount acquirer 124a with one another by the association controller 126. The association controller 126 associates the target objects with one another among the time-series images supplied from the cameras $11_1$, $11_2$, $11_3$ and the like based on a result of comparison of the feature amounts.

At next step S16, the output unit 127 outputs the result of a comparing process at step S15. For example, the output unit 127 adds the identification information to identify the same target object in the target objects included in the time-series images to each of the time-series images to output according to the result of comparison of the feature amount.

Detailed Process of First Embodiment

The image processing by the image processing device 10a of the first embodiment is next described in more detail with reference to the flowchart in FIG. 5 described above. At step S10, the image acquirer 120 acquires the time-series images supplied from the cameras $11_1$, $11_2$, $11_3$ and the like and adds to each acquired time-series image, the image identification information for identifying each of the cameras $11_1$, $11_2$, $11_3$ and the like from which the image is supplied. The image acquirer 120 supplies the time-series image to which the image identification information is added to the tracker 122.

At step S11, the tracker 122 detects the target object from each of the frame images included in each of the time-series images imaged by the cameras $11_1$, $11_2$, $11_3$ and the like acquired by the image acquirer 120 at step S10 and tracks the detected target object among the frame images in the time-series image. Hereinafter, for the purpose of description, it is described focusing on the time-series image acquired from the camera $11_1$ out of the cameras $11_1$, $11_2$, $11_3$ and the like unless otherwise noted.

Figure 9:
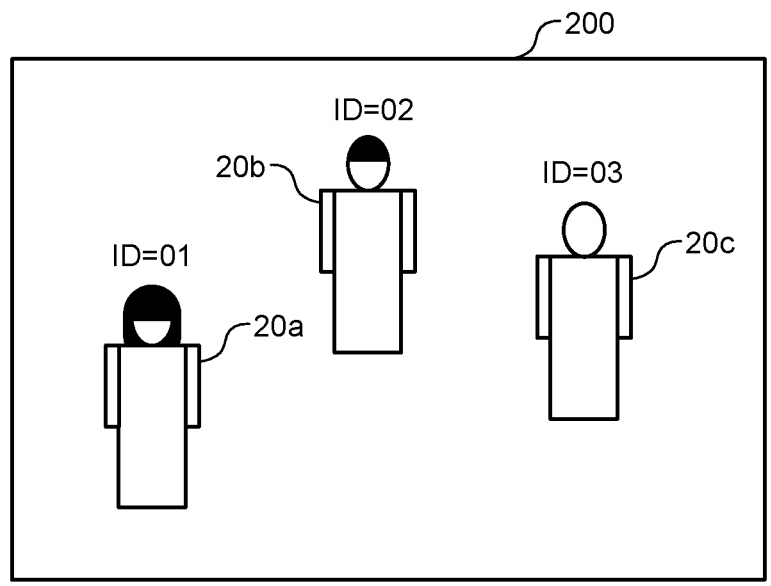
FIG. 9 is a view illustrating an example of the frame image including a plurality of target objects.

The tracker 122 detects the target object from the frame image by using a following method, for example. Suppose that three target objects 20a, 20b, and 20c are included in the frame image 200 as illustrated in FIG. 9. The target objects 20a, 20b, and 20c are humans; the tracker 122 sets a detection window area in the frame image 200 and calculates the feature amount from the image in the detection window area. For example, the tracker 122 may calculate a HOG (histograms of oriented gradients) feature amount acquired by making gradient and intensity of luminance in the detection window area a histogram as the feature amount. There is no limitation and the tracker 122 may also calculate a CoHOG (Co-occurrence HOG) feature amount (refer to Tomoki Watanabe, Satoshi Ito and Kentaro Yokoi: "Co-occurrence Histograms of Oriented Gradients for Human Detection", IPSJ Transactions on Computer Vision and Applications, Vol. 2, pp. 39-47. (2010)) acquired by modifying the HOG feature amount in terms of identification performance.

The tracker 122 discriminates whether the image in the detection window area is the target object by using the feature amount calculated in the above-described manner to detect the target object, for example. It is also possible to use the technology disclosed in Zdenek Kalal, Krystian Mikolajczyk and Jiri Matas: "Tracking-Learning-Detection", IEEE TRANSACTIONS ON PATTERN ANALYSIS AND MACHINE INTELLIGENCE, VOL. 6, NO. 1, JANUARY 2010, for example, for tracking the detected target object in the time-series image.

The tracker 122 supplies the information indicating the position of the target object in each frame image acquired as the result of tracking to the observed value extractor 123 after adding the moving object identification information to identify the target object to the same. In the example in FIG. 9, ID=01, ID=02, and ID=03 are added as the moving object identification information to the target objects 20a, 20b, and 20c detected from the frame image 200, respectively.

Figure 10:
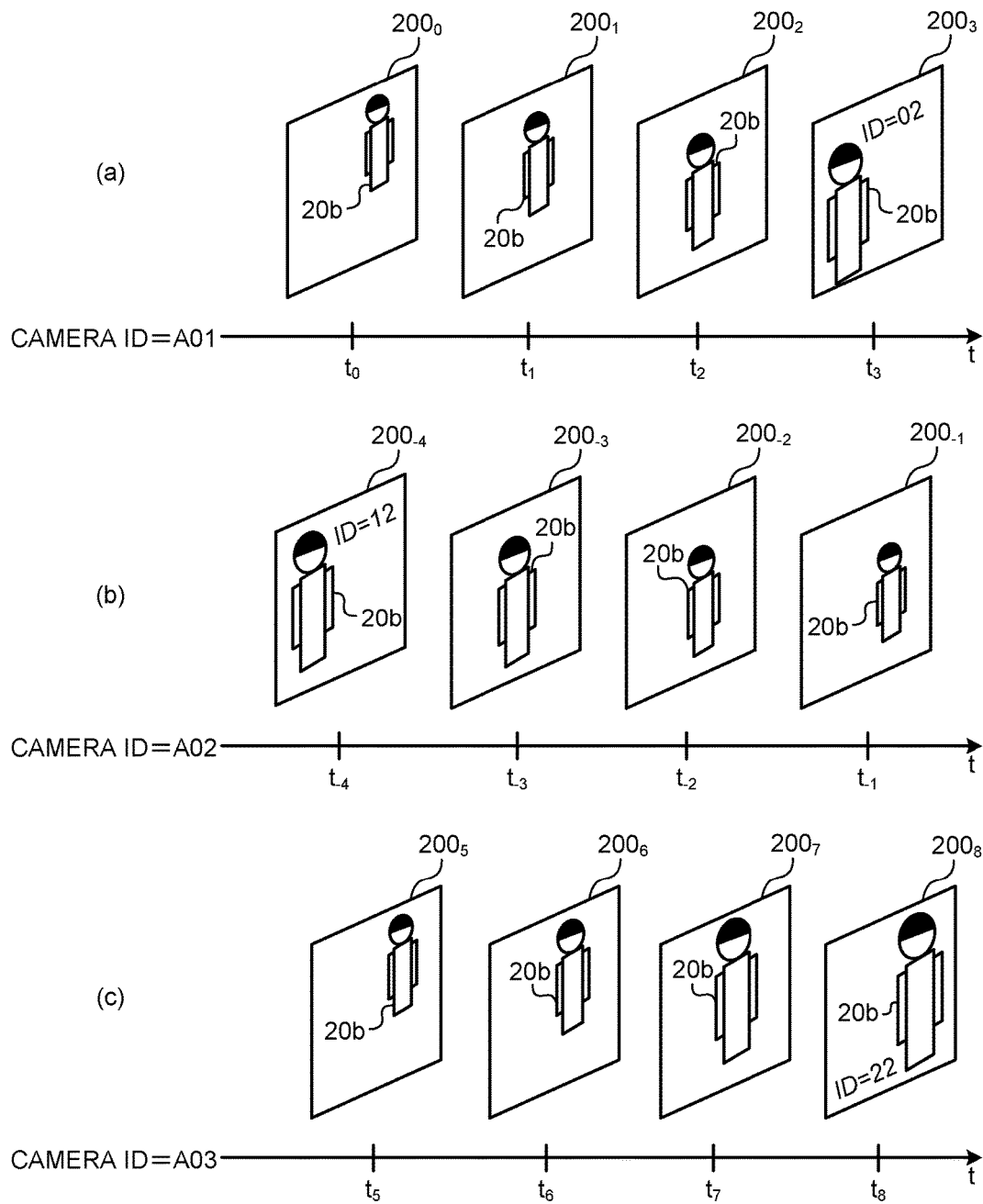
FIG. 10 illustrates a plurality of time-series images.

Herein, the tracker 122 tracks the target object among the frame images for each of the time-series images from a plurality of cameras $11_1$, $11_2$, $11_3$ and the like as illustrated in FIG. 10. In the example in FIG. 10, the image identification information is indicated as a camera ID, and the camera IDs of the time-series images acquired from the cameras $11_1$, $11_2$, and $11_3$ are set to camera ID=A01, camera ID=A02, and camera ID=A03, respectively, for example.

As illustrated in (a) in FIG. 10, in the time-series image with camera ID=A01, the target object 20b is included in frame images $200_0$, $200_1$, $200_2$, and $200_3$ acquired at times $t_0$, $t_1$, $t_2$, and $t_3$, respectively. As illustrated in (b) in FIG. 10, in the time-series image with camera ID=A02, the target object 20b is included in frame images $200_{-4}$, $200_{-3}$, $200_{-2}$, and $200_{-1}$ acquired at times $t_{-4}$, $t_{-3}$, $t_{-2}$, and $t_{-1}$, respectively, before the above-described time $t_0$. Similarly, as illustrated in (c) in FIG. 10, in the time-series image with camera ID=A03, the target object 20b is included in frame images $200_5$, $200_6$, $200_7$, and $200_8$ acquired at times $t_5$, $t_6$, $t_7$, and $t_8$ after the above-described time $t_3$. In this manner, the same target object 20b might be imaged at different timings by the cameras.

Meanwhile, the target objects 20b included in the time-series images with camera ID=A01, camera ID=A02, and camera ID=A03 are not recognized as the same target object 20b in a state in which they are not associated with one another among the time-series images by the association controller 126. Therefore, ID=02, ID=12, and ID=22 different from one another are added to the target objects 20b included in the time-series images with camera ID=A01, camera ID=A02, and camera ID=A03, respectively.

The observed value extractor 123 extracts the observed value from the target object (image of the target object) when the target object is included in each region acquired by dividing the frame image in the above-described manner (step S12 in FIG. 5). The observed value extractor 123 supplies the extracted observed value to the feature amount acquirer 124a after adding the image identification information and the moving object identification information to the same.

The observed value extracted by the observed value extractor 123 is the observed value corresponding to the feature value the distribution of which is stored in the distribution storage 125a. The feature value includes at least one of the height, an aspect ratio, a moving speed, an operation cycle, a unit operation interval, and a color of the target object (image of the target object) in the frame image, for example.

Figure 11:
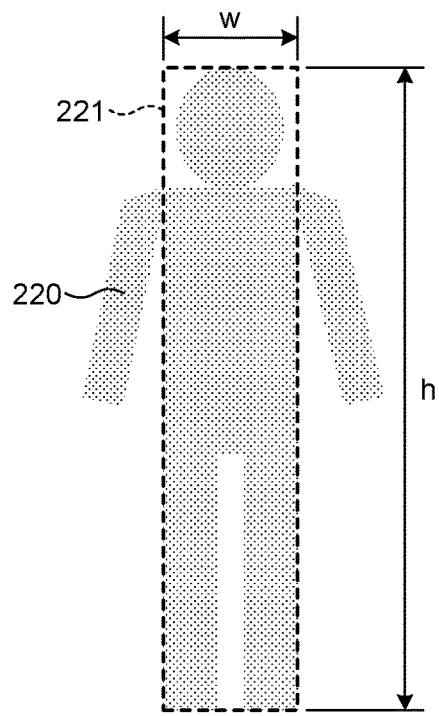
FIG. 11 is a view for illustrating height and an aspect ratio when the target object is a human.

The height is the height of the image of the target object in the frame image represented by the number of pixels, for example. The aspect ratio is the ratio between height and width of a minimum rectangle including the image of the target object. The height (body height) and the aspect ratio when the target object is the human are described with reference to FIG. 11. In FIG. 11, a minimum rectangle 221 including an entire body except the arms of a human image 220 is considered. The observed value extractor 123 sets height h of the rectangle 221 as the height in the feature value and extracts the ratio between height h and width w as the aspect ratio. Hereinafter, aspect ratio=w/h is satisfied.

The moving speed is calculated based on the tracked result of the target object by the tracker 122. The observed value extractor 123 may calculate the moving speed of the target object based on the installation height H, the imaging angle θ, and the image angle α of the camera $11_1$ described above, the number of frame images including the target object, and a coordinate of the target object in each frame image in a case of the time-series image supplied from the camera $11_1$, for example.

The operation cycle is the cycle of the operation when the target object moves with predetermined operation in the target object. The unit operation interval is a distance corresponding to one cycle of the operation cycle. When the target object is the human, the operation cycle and the unit operation interval are a walking cycle and a step length, respectively, for example.

Figure 12:
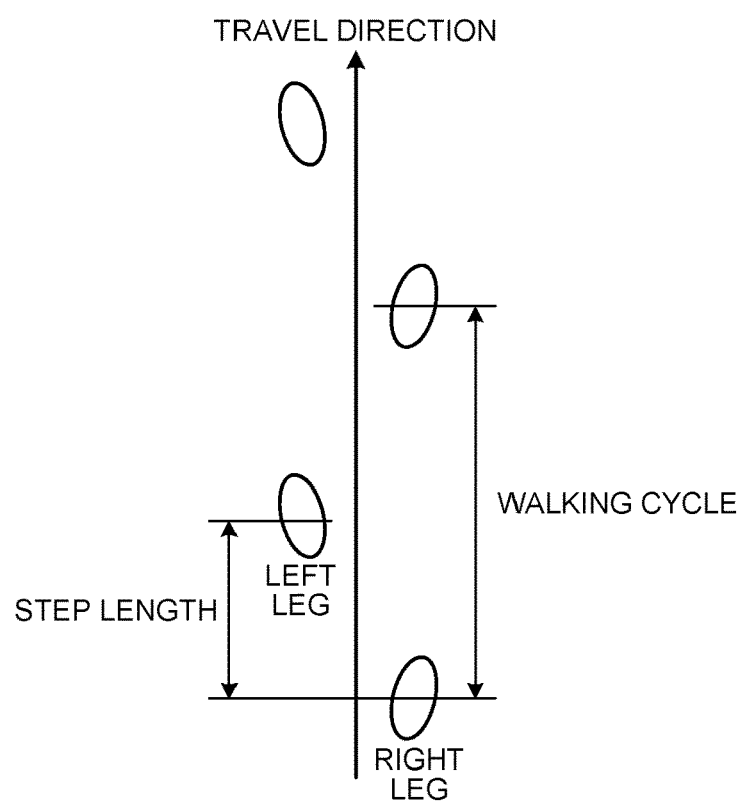
FIG. 12 is a view for schematically illustrating a walking cycle and a step length.
Figure 13:
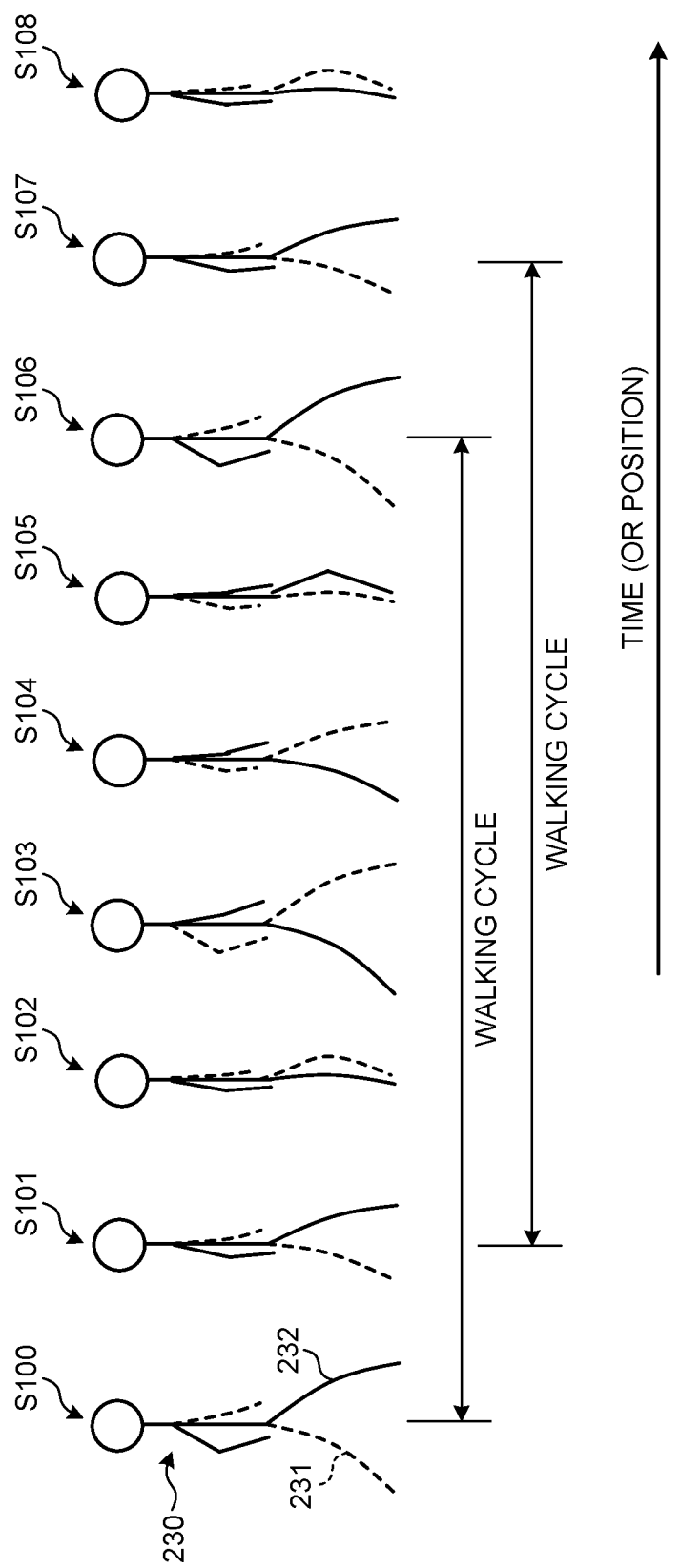
FIG. 13 is a view for schematically illustrating the walking cycle and the step length.

The walking cycle and the step length are schematically described with reference to FIGS. 12 and 13. FIG. 12 illustrates an example of footprints left by landing of a right leg and a left leg when the human walks. FIG. 13 schematically illustrates an example of the operation of the human 230 when the human 230 walks in a travel direction. In FIG. 13, an arrow in a right direction indicates elapse of time. That is to say, FIG. 13 illustrates a state in which the human 230 moves while alternatively moving a right leg 231 and a left leg 232 such that the operation is decomposed in units of frame image, for example, in chronological order (steps S100 to S108).

The walking cycle corresponds to an interval (distance) between the landing of the leg on the same side out of the right and left legs as illustrated in FIG. 12. The observed value extractor 123 may detect the walking cycle as the cycle of the images in which the right leg 231 and the left leg 232 are alternatively moved as illustrated in FIG. 13. In the example in FIG. 13, the walking cycle may be detected based on the images having corresponding silhouettes as from step S100 to step S106 and from step S101 to step S107. For example, the walking cycle may be extracted by using the technology disclosed in Yasushi Makihara, Ryusuke Sagawa, Yasuhiro Mukaigawa, Tomio Echigo and Yasushi Yagi: "Gait Identification Using a View Transformation Model in the Frequency Domain", IPSJ Transactions on Computer Vision and Image Media, Vol. 48, No. SIG 1 (CVIM 17), pp. 78-87, February 2007 as the number of frames with which normalized autocorrelation of the silhouettes of the target human in the time-series image is maximum.

The step length corresponds to a distance between the right leg and the left leg when the distance between them is the largest. In the example in FIG. 12, the step length is the distance in the travel direction between the footprint by the landing of the right leg and the footprint by the landing of the left leg subsequent to the same. The observed value extractor 123 may extract the step length by detecting the frame image in which the legs are kept apart the most (for example, frame images at steps S100, S103, and S106 in FIG. 13) and using the number of pixels between the right and left legs in the frame by using the technology disclosed in Mayu OKUMURA, Yasushi MAKIHARA, Yasushi YAGI, Shinsuke NAKAMURA and Shigeo MORISHIMA: "The Online Measurement of the Gait Feature for an Audience-Participation Digital Entertainment", Proceedings of Meeting on Image Recognition and Understanding (MIRU 2009), pp. 1336-1343, Matsue, July 2009. It is also possible to calculate the step length based on the walking cycle and a moved distance in the screen.

The color is the color of the target object in the frame image which may be represented by each value of R (red), G (green), and B (blue), for example. The observed value extractor 123 may acquire information indicating the color of the target object by acquiring each value of R, G, and B of each pixel included in the image of the target object to tally, for example.

When the target object is the human, the color may be acquired as a skin color and a color balance of the colors of the entire human. The observed value extractor 123 may detect the face of the target object and calculate brightness based on each value of R, G, and B of the pixels included in the detected face portion to use the calculated brightness as the skin color, for example.

The observed value extractor 123 may also acquire the color balance of the target object by tallying each value of R, G, and B of the pixels included in the image of the target object to normalize, for example. In this case, the color balance may be acquired as a ratio of each value of R, G, and B. There is no limitation and the observed value extractor 123 may also acquire a color phase based on each value of R, G, and B of the pixels included in the image of the target object. In this case, it is possible to acquire the color balance as one value indicating the color phase.

Meanwhile, in a case in which the target object is included in the frame image across a boundary of the regions acquired by dividing the frame image, the observed value extractor 123 may determine the region in which the target object is regarded to be included based on a ratio of the target object included in both regions across the boundary.

Figure 14:
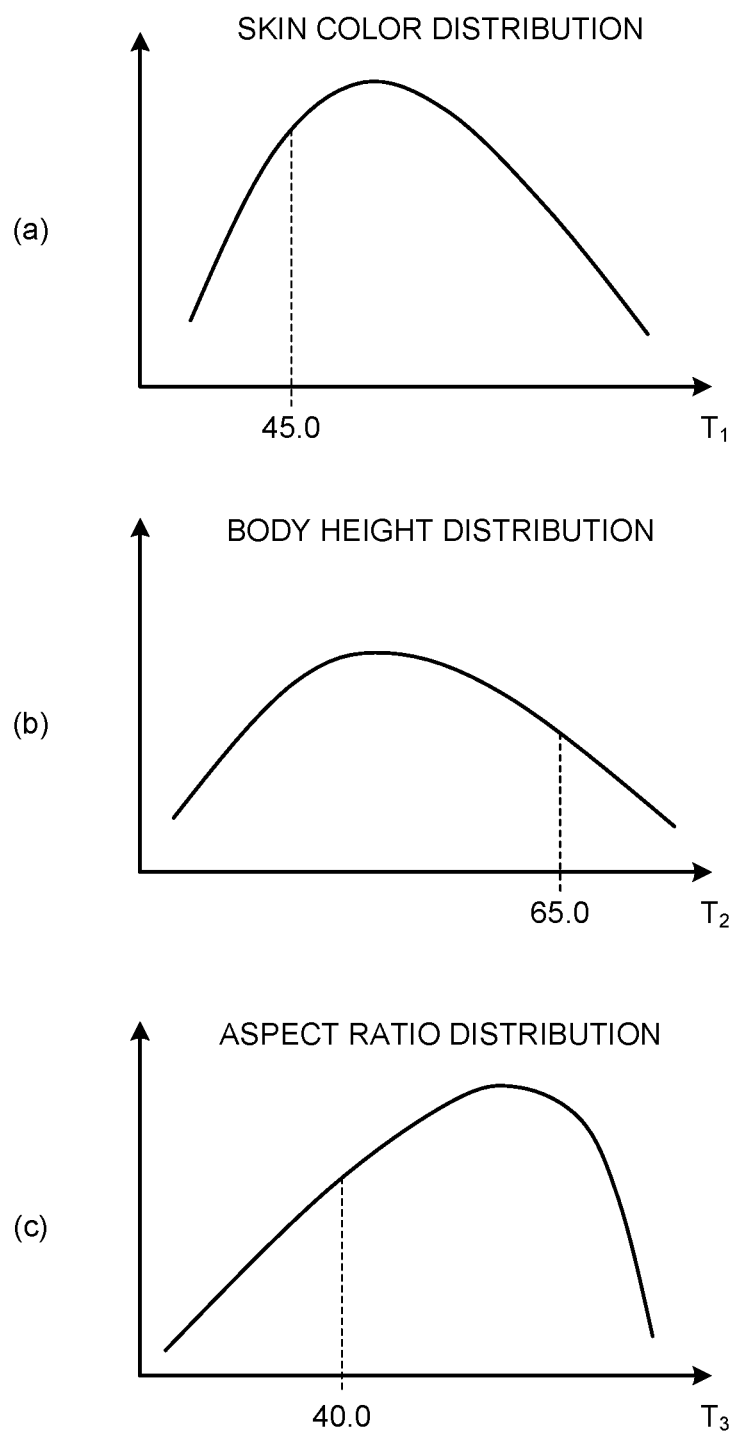
FIG. 14 illustrates examples of distribution of each feature value according to each embodiment.

The distribution storage 125a stores information indicating occurrence frequency distribution of each value for each value of the feature value for each feature value for each region acquired by dividing the frame image. The feature amount acquirer 124a acquires the information indicating the distribution of each feature value from the distribution storage 125a (step S13 in FIG. 5). FIG. 14 illustrates examples of the distribution of each feature value in each of which probability density is plotted along an axis of ordinate.

In FIG. 14, (a) illustrates an example of skin color distribution. In (a) in FIG. 14, a deviation value $T_1$ of the brightness regarding the skin color is plotted along an axis of abscissa and the brightness increases in a right direction, for example. In FIG. 14, (b) illustrates an example of body height (height) distribution. In (b) in FIG. 14, a deviation value $T_2$ of the body height is plotted along an axis of abscissa and the body height increases in the right direction, for example. In FIG. 14, (c) illustrates an example of aspect ratio distribution. In (c) in FIG. 14, the aspect ratio increases in the right direction, for example.

Meanwhile, for the purpose of description, it is herein supposed that the distribution of each feature value is normal distribution, and each distribution is represented by a parameter $\mu$ indicating an average and a parameter $\sigma$ indicating a root of the dispersion.

The feature amount acquirer 124a applies each observed value supplied from the observed value extractor 123 to the distribution of each feature value acquired from the distribution storage 125a to calculate the deviation value of each observed value (step S14 in FIG. 5). A deviation value $T(x)$ in the distribution of an observed value x may be calculated by following Equation (1).

$$T(x)=(x-\mu)/\sigma+50 \tag{1}$$

For example, suppose that the feature amount acquirer 124a calculates the deviation values such as a deviation value $T_1(x_1)$ of the brightness regarding the skin color=45.0, a deviation value $T_2(x_2)$ of the body height=65.0, and a deviation value of the aspect ratio $T_3(x_3)$=40.0 for a certain target object as illustrated in (a) to (c) in FIG. 14. The feature amount acquirer 124a acquires the feature amount having the deviation values $T_1(x_1)$, $T_2(x_2)$, and $T_3(x_3)$ of the observed values calculated for respective feature values in this manner as the feature vectors.

The feature amount acquirer 124a supplies the feature amounts acquired in the above-described manner based on the time-series images from the cameras $11_1$, $11_2$, $11_3$ and the like to the association controller 126 after adding the image identification information and the moving object identification information thereto.

The association controller 126 calculates similarity of the feature amounts based on the time-series images from the cameras $11_1$, $11_2$, $11_3$ and the like supplied from the feature amount acquirer 124a to determine whether it is possible to associate the feature amounts with one another. The association controller 126 may acquire the similarity by using an L1 norm and a Bhattacharyya distance among the feature amounts.

The association controller 126 may also determine whether it is possible to associate based on an output result acquired by extracting two feature amounts included in different time-series images from the feature amounts and bringing them together to identify by an identifier. An SVM (support vector machine) may be used, for example, as the identifier. The association controller 126 may calculate the similarity of a plurality of second feature amounts included in the time-series image different from that of a first feature amount to one first feature amount and determine that the second feature amount with the largest calculated similarity is associated with the first feature amount, for example. There is no limitation and the association controller 126 may also determine that the feature amounts with the similarity not smaller than a threshold are associated with each other.

The association controller 126 may output a result of associating the feature amounts with one another among the time-series images acquired in the above-described manner to outside through the output unit 127 as the result of association of the target object based on the moving object identification information.

In this manner, the image processing device 10a according to the first embodiment has the information indicating the feature value distribution for each region acquired by dividing the frame image based on the imaging distance and the like for each of the cameras $11_1$, $11_2$, $11_3$ and the like. The image processing device 10a associates the target objects with one another among the time-series images by the cameras $11_1$, $11_2$, $11_3$ and the like by using a relative value of the observed value of the target object relative to the feature value distribution in the region in which the target object is included as the feature amount in the target frame image. Therefore, it becomes possible to execute the association among the cameras with high accuracy without the calibration among the cameras $11_1$, $11_2$, $11_3$ and the like.

Second Embodiment

Figure 15:
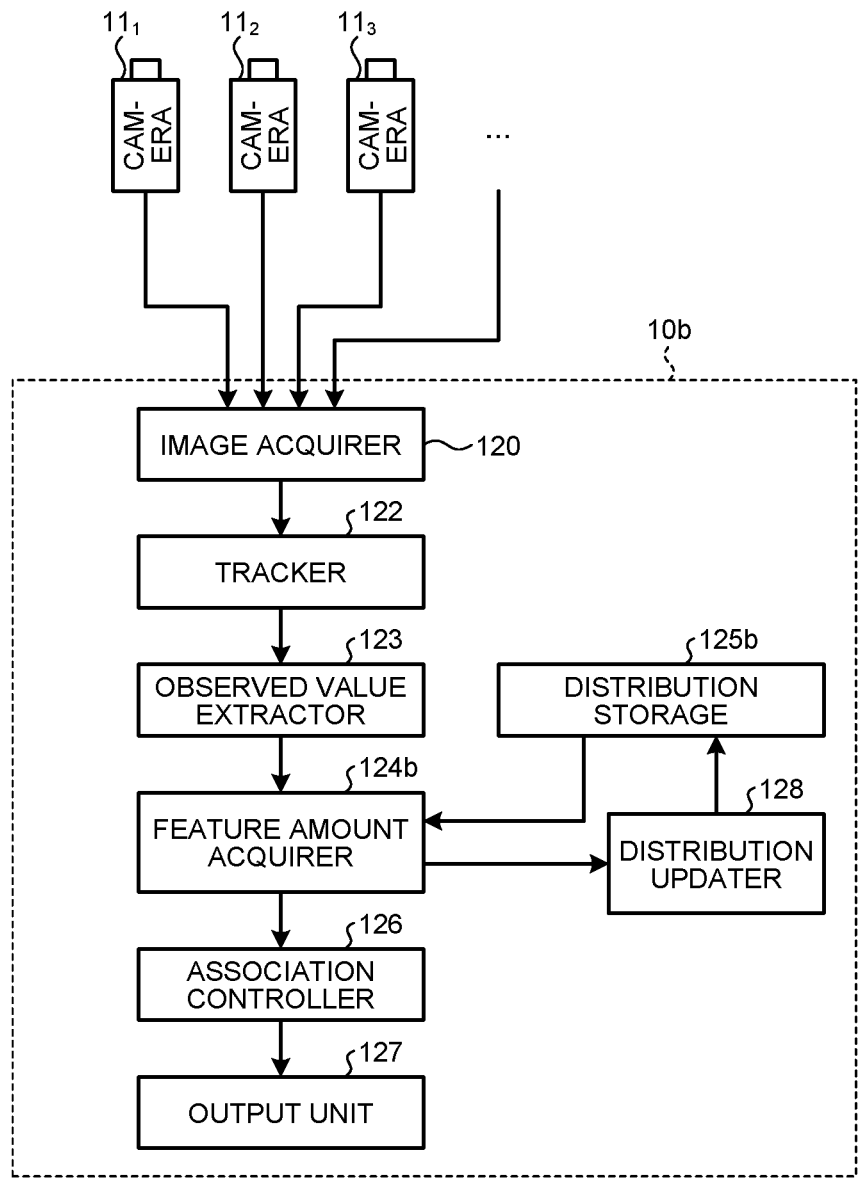
FIG. 15 is a block diagram illustrating a configuration of an example of an image processing device according to a second embodiment.

A second embodiment is next described. FIG. 15 illustrates a configuration of an example of an image processing device 10b according to the second embodiment. Meanwhile, in FIG. 15, the same reference numeral is assigned to a portion common to that in FIG. 4 described above and detailed description thereof is omitted. An image processing system described with reference to FIG. 1 may be directly applied to the second embodiment.

The image processing device 10b illustrated in FIG. 15 is acquired by adding a distribution updater 128 to an image processing device 10a illustrated in FIG. 4 and changing a part of functions of a feature amount acquirer 124a and a distribution storage 125a in FIG. 4 to acquire a feature amount acquirer 124b and a distribution storage 125b. In the second embodiment, the distribution updater 128 updates distribution information stored in the distribution storage 125b based on each observed value acquired by the feature amount acquirer 124b. The distribution storage 125b stores in advance information indicating initial distribution of each feature value for each region acquired by dividing each frame image by each of cameras $11_1$, $11_2$, $11_3$ and the like in an initial state. The information indicating the initial distribution (hereinafter, information of initial distribution) is information indicating standard distribution of the feature amount, for example.

Image processing according to the second embodiment is described with reference to flowcharts in FIGS. 16 and 17. Meanwhile, in the flowcharts in FIGS. 16 and 17, the same reference numeral is assigned to the same process as that in a flowchart in FIG. 5 described above and detailed description thereof is omitted. Hereinafter, for the purpose of description, a time-series image and a frame image acquired from the camera $11_1$ are described as an example.

Figure 16:
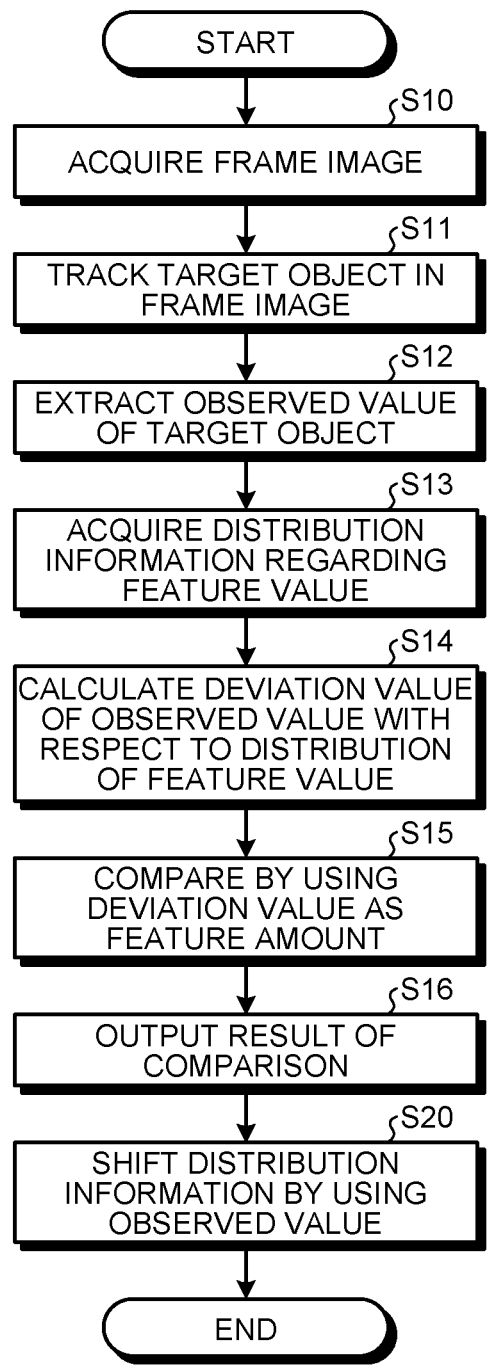
FIG. 16 is a flowchart of an example illustrating image processing according to the second embodiment.

FIG. 16 is the flowchart of an example illustrating the image processing in the initial state by the image processing device 10b according to the second embodiment. For example, the processing in the flowchart is executed by first activation of the image processing device 10b after installation thereof. There is no limitation and it is also possible to execute the processing in the flowchart when the image processing device 10b is first activated after reset of its setting.

Processes from step S10 to step S16 in the flowchart in FIG. 16 are executed as in the flowchart in FIG. 5 described above.

That is to say, at step S10, an image acquirer 120 acquires the frame image from the time-series image supplied from the camera $11_1$, and at next step S11, a tracker 122 detects a target object from the acquired frame image. The target object herein detected is the target object first detected after the activation of the image processing device 10b from the time-series image of the camera $11_1$.

At step S12, an observed value extractor 123 extracts the observed value of the target object detected from the frame image for each region acquired by dividing the frame image. At step S13, the feature amount acquirer 124b acquires the information of each initial distribution stored for each region acquired by dividing the frame image corresponding to the camera $11_1$ from the distribution storage 125b. Meanwhile, the processes at steps S12 and S13 are not required to be sequentially executed; they may be executed in parallel or the order of the processes may be changed.

At next step S14, the feature amount acquirer 124b acquires the deviation value of each observed value extracted by the observed value extractor 123 at step S12 by using the information indicating the feature value distribution acquired from the distribution storage 125b at step S13. Then, the feature amount acquirer 124b acquires the feature amount having the acquired deviation value as a feature vector.

The processes at steps S10 to S14 described above are executed for the time-series image output from each of the cameras $11_1$, $11_2$, $11_3$ and the like.

At next step S15, an association controller 126 compares the feature amounts corresponding to the cameras $11_1$, $11_2$, $11_3$ and the like acquired by the feature amount acquirer 124b with one another and associates the target objects with one another among the time-series images. At next step S16, the output unit 127 outputs a result of comparison at step S15.

Meanwhile, the processes at steps S16 and S20 are not required to be sequentially executed; they may be executed in parallel or the order of the processes may be changed.

At next step S20, the feature amount acquirer 124b passes the deviation value of each measured value acquired at step S14 to the distribution updater 128. The distribution updater 128 shifts each initial distribution stored in the distribution storage 125b based on each deviation value passed from the feature amount acquirer 124b. For example, the distribution updater 128 shifts the distribution such that the observed value is placed on the center of the distribution in the initial distribution of a certain feature value.

FIG. 17 is the flowchart of an example illustrating the image processing executed after the processing in the flowchart in FIG. 16 described above is finished by the image processing device 10b according to the second embodiment. The processes at steps S10 to S16 are the same as those of the flowchart in FIG. 16 described above, so that the description thereof is herein omitted.

In a case of the flowchart in FIG. 17, the output unit 127 outputs the result of comparison at step S16, and thereafter, the procedure shifts to step S21. At step S21, the distribution updater 128 updates the information indicating the feature value distribution for each region of the frame image stored in the distribution storage 125b by using the observed value acquired at step S12. Meanwhile, in this case also, the processes at steps S16 and S21 are not required to be sequentially executed; they may be executed in parallel or the order thereof may be changed.

In this manner, according to the second embodiment, the information indicating the feature value distribution stored in the distribution storage 125b is updated by using the observed value extracted from the target object. Therefore, it is possible to execute the association of the target objects among the time-series images with high accuracy even in a case in which tendency of the observed value of each of the target objects detected from the time-series images output from the cameras $11_1$, $11_2$, $11_3$ and the like is significantly different according to periods of time, for example.

In the second embodiment, the image processing device 10b also associates the target objects with one another among the time-series images by the cameras $11_1$, $11_2$, $11_3$ and the like by using a relative value of the observed value of the target object relative to the feature value distribution in the region in which the target object is included as the feature amount in the target frame image. Therefore, it becomes possible to execute the association among the cameras with high accuracy without the calibration among the cameras $11_1$, $11_2$, $11_3$ and the like.

Meanwhile, although it is described above that the initial distribution stored in the distribution storage 125b is shifted by using the observed value of the target object first detected after the activation of the image processing device 10b from the time-series image of the camera $11_1$ in the flowchart in FIG. 16, this is not limited to this example.

For example, there may be a case in which the deviation value in the initial distribution of the observed value of the target object first detected after the activation is extremely large or small. In such a case, the distribution shifted based on the observed value becomes biased distribution and there is a case in which high accuracy cannot be realized in the association of the target objects among the time-series images. In this case, the distribution updater 128 may perform threshold determination on the deviation value of the observed value calculated at step S14 and shift the initial distribution stored in the distribution storage 125b by using only the observed value having the deviation value within a predetermined range, for example.

There is no limitation and the distribution updater 128 may also execute the shift of the initial distribution stored in the distribution storage 125b based on each observed value of a plurality of target objects detected after the activation.

For example, the distribution updater 128 acquires an average value of the observed values of the predetermined number of target objects detected after the activation and shifts the initial distribution stored in the distribution storage 125b by using the average value.

Although the distribution updater 128 shifts the initial distribution stored in the distribution storage 125b based on the observed value of the target object detected from the frame image in the description above, this is not limited to this example. For example, the distribution updater 128 may shift the initial distribution stored in the distribution storage 125b according to a value set by a user.

Another Embodiment

Meanwhile, an image processing program for executing image processing according to each embodiment is recorded in a computer-readable storage medium, which may be provided as a computer program product, such as a CD (compact disk) and a DVD (digital versatile disk) as a file of an installable format or executable format to be provided. There is no limitation and it is also possible to store the image processing program in a ROM 102 in advance to provide.

Furthermore, it is also possible to configure such that the image processing program for executing the image processing according to each embodiment is stored on a computer connected to a communication network such as the Internet and downloaded via the communication network to be provided. It is also possible to configure such that the image processing program for executing the image processing according to each embodiment and a modified example is provided or distributed through the communication network such as the Internet.

The image processing program for executing image processing according to each embodiment and the modified example has a module configuration including the above-described units (image acquirer 120, tracker 122, observed value extractor 123, feature amount acquirer 124a, association controller 126, and output unit 127), for example, in the case of the first embodiment; as actual hardware, a CPU 101 reads the image processing program from a storage 104, for example, to execute, so that the above-described units are loaded on a main storage device (for example, RAM 103) and each unit is generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
storage; and
a processor configured to at least:
acquire a time series of images from each of a plurality of imaging devices;
track position of a target object in each time series of images;
control storing, in the storage, distributions of feature values for respective regions into which each image of a respective time series of images is divided based on an imaging range of an imaging device corresponding to the respective time series of images;
extract observed values corresponding to feature values in the regions of images in respective time series of images;
acquire feature amounts based on deviation values of the observed values in the distributions of feature values; and
associate tracked target objects with one another among multiple time series of images acquired from the plurality of imaging devices based on the feature amounts.

2. The device according to claim 1, wherein the processor is configured to acquire, as a feature amount, a vector of the deviation value of each of observed values corresponding to a plurality of kinds of feature values.

3. The device according to claim 1, wherein the storage further stores the distribution of the feature value for each of the regions into which each image of the time series of images is divided according to change in a moving direction of the target object in the time series of images.

4. The device according to claim 1, wherein the processor is configured to update the distributions stored in the storage according to the observed values.

5. The device according to claim 4, wherein
the storage pre-stores initial distribution, and
the processor is configured to shift the initial distribution according to the observed value extracted in an initial state.

6. The device according to claim 1, wherein the feature values include at least one of height, aspect ratio, moving speed, operation cycle, basic operation interval, and color information of the target object.

7. The device according to claim 1, wherein imaging devices of the plurality of imaging devices have imaging ranges different from one another.

8. An image processing method comprising:
acquiring a time series of images from each of a plurality of imaging devices;
tracking position of a target object in each time series of images;
storing, in a storage, distributions of feature values for respective regions into which each image of a respective time series of images is divided based on an imaging range of an imaging device corresponding to the respective time series of images;
extracting observed values corresponding to feature values in the regions of images in respective time series of images;
acquiring feature amounts based on deviation values of the observed values in the distributions of feature values; and
associating tracked target objects with one another among multiple time series of images acquired from the plurality of imaging devices based on the feature amounts.

9. A computer program product comprising a non-transitory computer-readable medium containing a program that, when executed by a computer, causes the computer to execute:
acquiring a time series of images from each of a plurality of imaging devices;
tracking position of a target object in the time series of images;
storing, in a storage, distributions of feature values for respective regions into which each image of a respective time series of images is divided based on an imaging range of an imaging device corresponding to the respective times series of images;

extracting observed values corresponding to feature values in the regions of images in respective time series of images;

acquiring feature amounts based on deviation values of the observed values in the distributions of feature values; and associating tracked target objects with one another among multiple time series of images acquired from the plurality of imaging devices based on the feature amounts.

10. An image processing system comprising:
a plurality of imaging devices;
storage; and
a processor configured to at least:
acquire a time series of images from each of the plurality of imaging devices;
track position of a target object in the time series of images;
control storing, in the storage, distributions of feature values for respective regions into which each image of a respective time series of images is divided based on an imaging range of an imaging device corresponding to the respective time series of images;
extract observed values corresponding to feature values in the regions of images in respective time series of images;
acquire feature amounts based on deviation values of the observed values in the distributions of feature values;
associate tracked target objects with one another among multiple time series of images acquired from the plurality of imaging devices based on the feature amounts; and
present information indicating the target objects associated with one another among the multiple time series of images.

* * * * *